United States Patent
Feldman et al.

(10) Patent No.: US 6,594,638 B1
(45) Date of Patent: Jul. 15, 2003

(54) ON-LINE METHOD AND APPARATUS FOR COLLECTING DEMOGRAPHIC INFORMATION ABOUT A USER OF A WORLD-WIDE-WEB SITE AND DYNAMICALLY SELECTING QUESTIONS TO PRESENT TO THE USER

(75) Inventors: Daniel Feldman, New York, NY (US); Allan Lee, New York, NY (US); Brad Chesman, New York, NY (US)

(73) Assignee: Netstakes, Inc., New York, NY (US)

( * ) Notice: Subject to any disclaimer, the term of this patent is extended or adjusted under 35 U.S.C. 154(b) by 0 days.

(21) Appl. No.: 09/287,863

(22) Filed: Apr. 7, 1999

(51) Int. Cl.[7] .............................................. G06F 157/00

(52) U.S. Cl. ......................................... 705/14; 705/10

(58) Field of Search ............................... 705/10, 14, 17

(56) References Cited

U.S. PATENT DOCUMENTS

| | | | | |
|---|---|---|---|---|
| 5,576,951 A | * | 11/1996 | Lockwood ................. | 705/27 |
| 5,636,346 A | * | 6/1997 | Saxe ........................ | 705/1 |
| 5,740,035 A | * | 4/1998 | Cohen et al. .............. | 705/10 |
| 5,774,869 A | * | 6/1998 | Toader ...................... | 705/10 |
| 5,774,870 A | * | 6/1998 | Storey ....................... | 705/14 |
| 5,794,210 A | * | 8/1998 | Goldhaber et al. ......... | 705/14 |
| 5,893,075 A | * | 4/1999 | Plainfield et al. .......... | 705/14 |
| 5,915,243 A | * | 6/1999 | Smolen ..................... | 705/14 |
| 5,970,467 A | * | 10/1999 | Alavi ........................ | 705/10 |
| 6,061,060 A | * | 5/2000 | Berry et al. ................ | 345/340 |
| 6,236,975 B1 | * | 5/2001 | Boe et al. .................. | 705/10 |

FOREIGN PATENT DOCUMENTS

| | | | | |
|---|---|---|---|---|
| WO | WO 9722058 A1 | * | 6/1997 | ......... G06F/15/21 |
| WO | WO 9723838 A1 | * | 7/1997 | ......... G06F/17/60 |

OTHER PUBLICATIONS

Dialog File 148, Accession No. 09234272; Direct Marketing Association finalizes self-regulation principles for online marketing; Business Wire, 91281226. Jan. 1997.*

(List continued on next page.)

Primary Examiner—Tariq R. Hafiz
Assistant Examiner—Romain Jeanty
(74) Attorney, Agent, or Firm—Reed Smith LLP

(57) ABSTRACT

An on-line method and apparatus for collecting demographic information from a user of a home WWW site and for dynamically selecting questions to present to the user. A plurality of sponsor symbols are displayed for the user on the home WWW site. Each of the sponsor symbol corresponds to an entity that has paid an owner of the home WWW site for the right to be presented to the user on the site. A signal is received at the home WWW site from the user indicating a selection of one of the sponsor symbols by the user. In response to the selected sponsor symbol, a first set of one or more prize symbols are displayed for the user on the home WWW site. Each prize symbol corresponds to a prize that the user can register to win at no cost to the user. A further signal is then received at the home WWW site from the user indicating a selection of a prize symbol from the first set of prize symbols by the user. Next, the system determines whether the user is a registered user of the home WWW site and, if the user is not a registered user of the home WWW site, the system collects demographic information about the user during registration of the user on the home WWW site. In response to the demographic information, at least one question is selected from a first plurality of candidate questions, wherein each of the first plurality of candidate questions is associated with the entity corresponding to the selected sponsor symbol. The selected question is displayed to the user on the home WWW site. Next, a signal is received from the user indicating an answer of the user to the selected question, and the answer is stored in a database. Finally, after the user answers the question, the user is redirected from the home WWW site to a further WWW site associated with the selected sponsor symbol.

21 Claims, 8 Drawing Sheets

300

OTHER PUBLICATIONS

Dialog File 16, Accession No. 05706922; Tritium Network Launches Free Internet Service in San Jose; Business Wire, p7131042. Jan. 1998.*

Dialog File 9, Accession No. 01345345; "Interactive Marketing on the World Wide Web"; Retail Banker International, n 338, p 3. Nov. 1995.*

"Interactive Marketing Briefs", Phillips Media Group's interactive Marketing News; Dec. 13, 1996.*

"Netstakes Changes Name to Webstakes Leveraging Successful Web Brand to Support Company's Phenomenal Growth", Business Wire; New York; Mar. 4, 1998.*

Businesswire "Netstakes Attracts Top Web Sites And Product Sponsors By Introducing Innovative Cost Model".*

Doubleclick "Direct marketers are finding that e–mail provides an effective means of reaching out to customers"., 1998, Advertising Age Online Media Strategies Supplement, p 57A–64A, Dialog file 13, Accession No. 01075373.*

"Netstakes Attracts Top Web Sites And Product Sponsors By Introducing Innovative Cost Model", Oct. 1996, Business Wire.*

"Company Launches Second Web Site on Heels of Sweepstakes' Success", Dec. 1997, Direct Marketing News.*

"MatchLogic Creates Web Ad Intermediary"; Aug. 1997; Electronic Advertising & Marketplace Report, V11, n16; Dialog file 636, Accession No. 03675052.*

"Chevrolet's Great American Soccer Pavillion HitsThe Road"; Aug. 1998; PR Newswire Association Inc; Dialog file 813, Accession No. 1323850.*

"Hyundai Goes to College"; Aug. 1992; PR Newswire Association Inc. Dialog file 813, Accession No. 0510410.*

"Databases add up for brewers"; Feb. 1992; Advertising Age, v63, n7, p12; Dialog file 16, Accession No. 02124137.*

"Computers & Privacy—World Govts Tackle Web"; Apr. 1996, Newsbytes, pNEW04010018; Dialog file 275, Accession No. 01918390.*

"Getting Interactive"; May 1993; Promo, v0, n0, p39; Dialog file 16, Accession No. 02829363.*

* cited by examiner

Enter Daily to Win Great Prizes in Every Category

Auto — 202
Sony Car Stereos, Infant Car
Seats, Auto Alarms... — 204

Business & Finance
Palm Pilots, Iomega Zip Drives,
Canon Copiers...

College Life
Aiwa Stereos, Sanyo mini-
refrigerator... — 206

Family & Kids
$150 Gift Certificates to Gap
Kids & Macy's...

House & Home
Panasonic Bread Bakers, Eureka
Vacuum Cleaners...

Sports & Health
Sports Authority Gift Certificates,
Samsung Camcorders...

Books & Music
Music Blvd Gift Certificates,
Panasonic CD Players...

College Education
Iomega Zip Drive, REI Duffel
Bags...

Computing Products
CDW Gift Certificates, Digital
Cameras...

Games & Casino
$150 Gift Certificates from
Macy's & The Sharper Image...

Movies & Video
Panasonic TVCRs, CD-Rom
Bundles, JVC Stereos...

Travel & Outdoors
Digital Video Cameras, Olympus
Binoculars...

FIG. 2

Shipping Information...So We Can Send Your Prize If You Win!
We Apologize, But We Are Currently Legally Restricted From Offering Our Sweepstakes Outside The United States & Canada, Except Quebec.

○ Mr. ○ Mrs. ○ Miss ○ Ms.

First Name: [_____] Middle Initial: [__]
Last Name: [_____]
Home Address: [_____]
Apt/Suite: [____]
City: [_____]
State or Province: [(click here to select) ▼]
Zip/Postal Code: [____] [USA ▼]
Phone*: [__] [____]

500

*This is required for shipping prizes only. You will not be contacted without your permission.

Help Us Decide What Types Of Prizes To Give Away - Tell Us A Little More About Yourself:

1. Marital Status: [(click to select) ▼]
2. Your Occupation: [(click to select) ▼]
3. Employment Status: [(click to select) ▼]
4. Household Income: [(click to select) ▼]
5. Level of Education: [(click to select) ▼]
6. Birthday: [(month)▼] [(day)▼] 19[0▼][0▼]

For Your Primary Residence Do You   ○ Own ○ Rent

8. Not Including Yourself, What Is The Gender And Age Of Other People Living In Your Household?

○ There's no one else in my household, OR-
○ Child Under 1 year

| Gender | Age in Years |
|---|---|
| ○ Male ○ Female | [(click to select)▼] |
| ○ Male ○ Female | [(click to select)▼] |
| ○ Male ○ Female | [(click to select)▼] |
| ○ Male ○ Female | [(click to select)▼] |

9. Do You Want To Receive The Weekly Webstakes Update? ● Yes ○ No
(This Free Email Gives You The Latest Information About Our New Sweepstakes, Prizes, & Special Savings Offers.)

Do You Want To Receive Occasional Special Savings Offers, Information, Or Sweepstakes Invitations By Electronic Or Postal Mail? ○ Yes ○ No

[Register Me !] [Reset]

③ Kids are expensive! Take charge of your family's finances - trade online with Datek and you'll get which of the following benefits? (hint: think big)

| click here to select ▼ |

④ Enter me for this prize and take me to the sponsor — 620

It's never too soon to excel!
It's a competitive world out there and your V.I.L.P.s (Very Important Little Persons) need to impress to get ahead, whether it's the first day of kindergarten or a job interview at the local lemonade stand. With $150 to spend at Gap Kids, you can make sure they're ready!

- Wardrobes for boys, girls, and infants
- A full selection of Gap jeans in easy, loose, wide-led fits and more
- Visit Gap online to try out the winter sampler and the zoom view of selected items

LOGO

FIG. 6

ON-LINE METHOD AND APPARATUS FOR COLLECTING DEMOGRAPHIC INFORMATION ABOUT A USER OF A WORLD-WIDE-WEB SITE AND DYNAMICALLY SELECTING QUESTIONS TO PRESENT TO THE USER

BACKGROUND OF THE INVENTION

I. Field of the Invention

This invention relates generally to the world-wide-web (WWW). In particular, the present invention relates to systems for collecting demographic and marketing information from users on the WWW. Still more particularly, the present invention relates to a novel method for presenting marketing questions to a WWW user based on the user's demographics and/or responses given by the user to previous marketing questions.

II. Description of the Related Art

The Internet has emerged as a global medium, enabling millions of people worldwide to share information, communicate and conduct business. The Internet represents a significant opportunity for businesses to conduct commerce. One way that businesses conduct Internet commerce currently is through banner advertising on the sites of others. Such banner advertising is often not particularly well focused on a particular demographic group. In addition, a business that purchases a banner advertisement is often able to learn very little from a marketing perspective about users that visit the advertiser's site in response to the advertisement. What is needed is a system that allows an Internet advertiser to interact with internet users more actively during the advertising process, thereby allowing the advertiser to build relationships with such users and collect valuable demographic and marketing information about the users during the advertising process.

SUMMARY OF THE INVENTION

The present invention is directed to an on-line method and apparatus for collecting demographic information from a user of a home WWW site and for dynamically selecting questions to present to the user. A plurality of sponsor symbols are displayed for the user on the home WWW site. Each of the sponsor symbol corresponds to an entity that has paid an owner of the home WWW site for the right to be presented to the user on the site. A signal is received at the home WWW site from the user indicating a selection of one of the sponsor symbols by the user. In response to the selected sponsor symbol, a first set of one or more prize symbols are displayed for the user on the home WWW site. Each prize symbol corresponds to a prize that the user can register to win at no cost to the user. A further signal is then received at the home WWW site from the user indicating a selection of a prize symbol from the first set of prize symbols by the user. Next, the system determines whether the user is a registered user of the home WWW site and, if the user is not a registered user of the home WWW site, the system collects demographic information about the user during registration of the user on the home WWW site. In response to the demographic information, at least one sponsor-specific question is selected from a first plurality of sponsor-specific candidate questions, wherein each of the first plurality of sponsor-specific candidate questions is associated with the entity corresponding to the selected sponsor symbol. A selected sponsor-specific question is displayed to the user on the home WWW site. Next, a signal is received from the user indicating an answer of the user to the selected sponsor-specific question, and the answer is stored in a database. Finally, after the user answers the sponsor-specific question, the user is redirected from the home WWW site to a further WWW site associated with the selected sponsor symbol.

In accordance with a further aspect, the steps described above are performed during an initial visit of the user to the home WWW site. Thereafter, during a second visit of the user to the WWW site, the answer given by the user to the previously selected sponsor-specific question may optionally be used, in conjunction with the user's demographic information, to select a further sponsor-specific question to present to the user. During the next visit of the user to the home WWW site, the plurality of sponsor symbols are redisplayed for the user on the home WWW site, and a signal is received at the home WWW site from the user indicating a selection of one of the redisplayed sponsor symbols by the user. If the redisplayed sponsor symbol selected during the second visit to the home WWW site is the same as the sponsor symbol that was selected by the user during the first visit to the home WWW site, the first set of one or more prize symbols are redisplayed again for the user on the home WWW site. Next, a signal is received at the home WWW site from the user indicating a selection of a prize symbol from the redisplayed first set of prize symbols by the user. One or more further sponsor-specific questions are then selected from the first plurality of candidate sponsor-specific questions based on the demographic information. One or more previous answers to the sponsor-specific questions provided by the user may also be used as a basis for selection of the further sponsor-specific question. Each of the sponsor-specific questions from the first plurality of sponsor-specific questions selected for presentation to the user during the second visit to the home WWW site is different from the sponsor-specific question(s) from the first plurality of sponsor-specific questions selected for presentation to the user during the first visit to the home WWW site. A selected (unanswered) sponsor-specific question is then displayed to the user on the home WWW site, a signal is received from the user indicating an answer of the user to the displayed question, and the answer is stored in the database. Thereafter, the user is redirected from the home WWW site to the further WWW site associated with the selected sponsor symbol.

The process described in the paragraph above is then repeated during subsequent visits of the user to the home WWW site in which the user selects the same sponsor symbol, until all of the questions in the first plurality of sponsor-specific questions have been presented to the user. In one embodiment, if there are no sponsor-specific questions for the selected sponsor, or if the user visits the home WWW site and selects the same sponsor symbol enough times such that all of the questions in the first plurality of sponsor-specific questions have been presented to the user, then the system selects and presents site-specific questions to the user. In contrast to the sponsor-specific questions that solicit information that is tailored for a particular sponsor, the site-specific questions solicit more general marketing information from a user. In a preferred embodiment, the site-specific questions are selected during each visit of the user to the home WWW site based on the user's demographic information. One or more previous answers submitted by the user may also be used as a basis for selection of the site-specific questions. The responses to these site-specific questions are also stored in the database. Regardless of whether the user is presented a sponsor-specific question or a site-specific question during the visit to the home WWW site, the user is redirected to the further WWW site associated with the selected sponsor symbol after the user answers the question.

BRIEF DESCRIPTION OF THE DRAWINGS

The features, objects and advantages of the present invention will become more apparent from the detailed description set forth below when taken in conjunction with the drawings in which like reference characters identify corresponding elements and wherein:

FIG. 2 is an exemplary introductory page of the home WWW site in accordance with the present invention.

FIG. 5 is an exemplary page used for registering and collecting demographic information from a user on the home WWW site, in accordance with the present invention.

FIG. 6 is an exemplary page that displays a sponsor-specific question to the user on the home WWW site, in accordance with the present invention.

DETAILED DESCRIPTION OF THE PREFERRED EMBODIMENTS

Figure 1A:
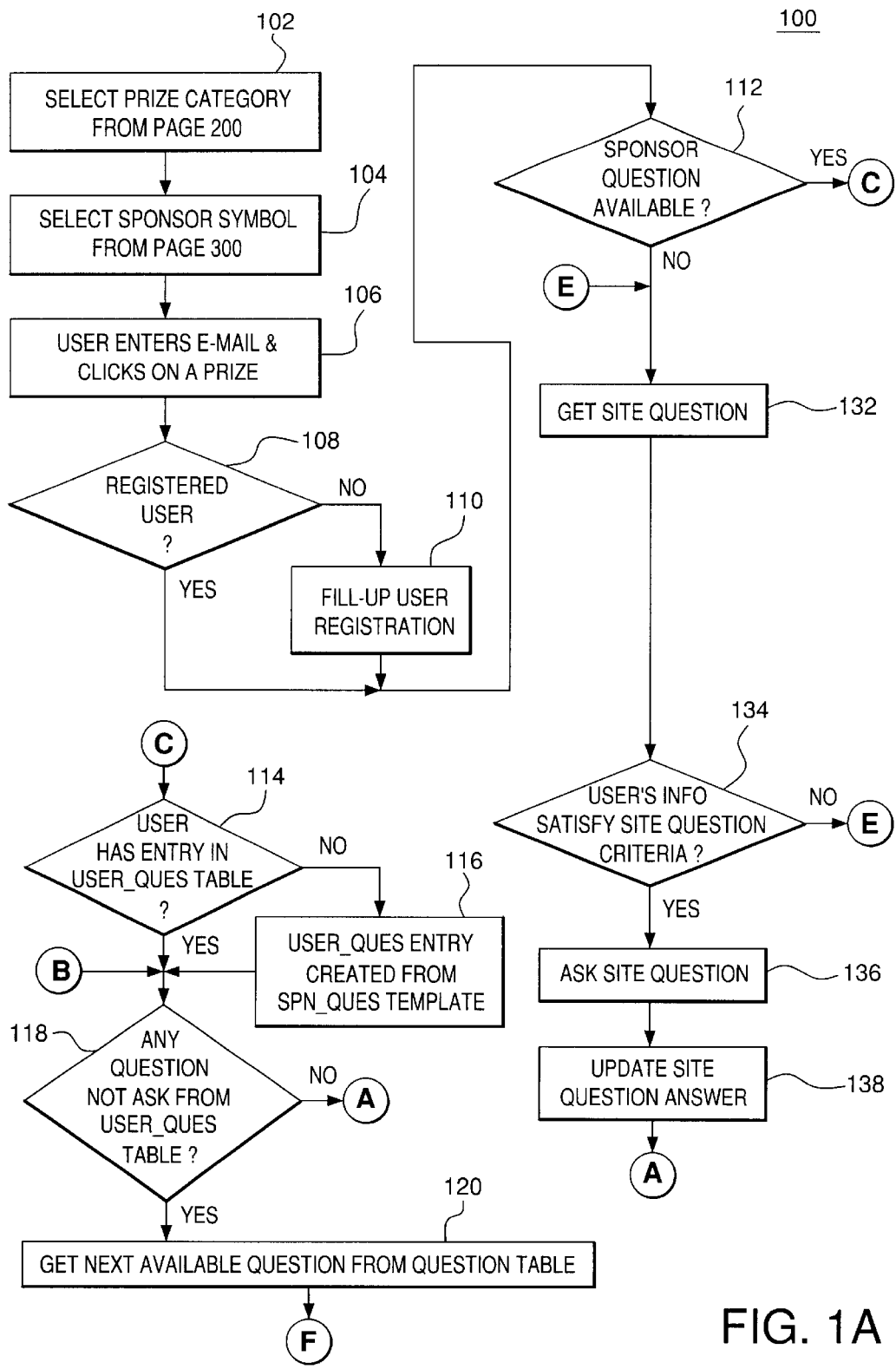
FIGS. 1A and 1B depict a flow diagram showing the operation of an on-line system for collecting demographic information from a user of a home WWW site and for dynamically selecting questions to present to the user, in accordance with the present invention.
Figure 1B:
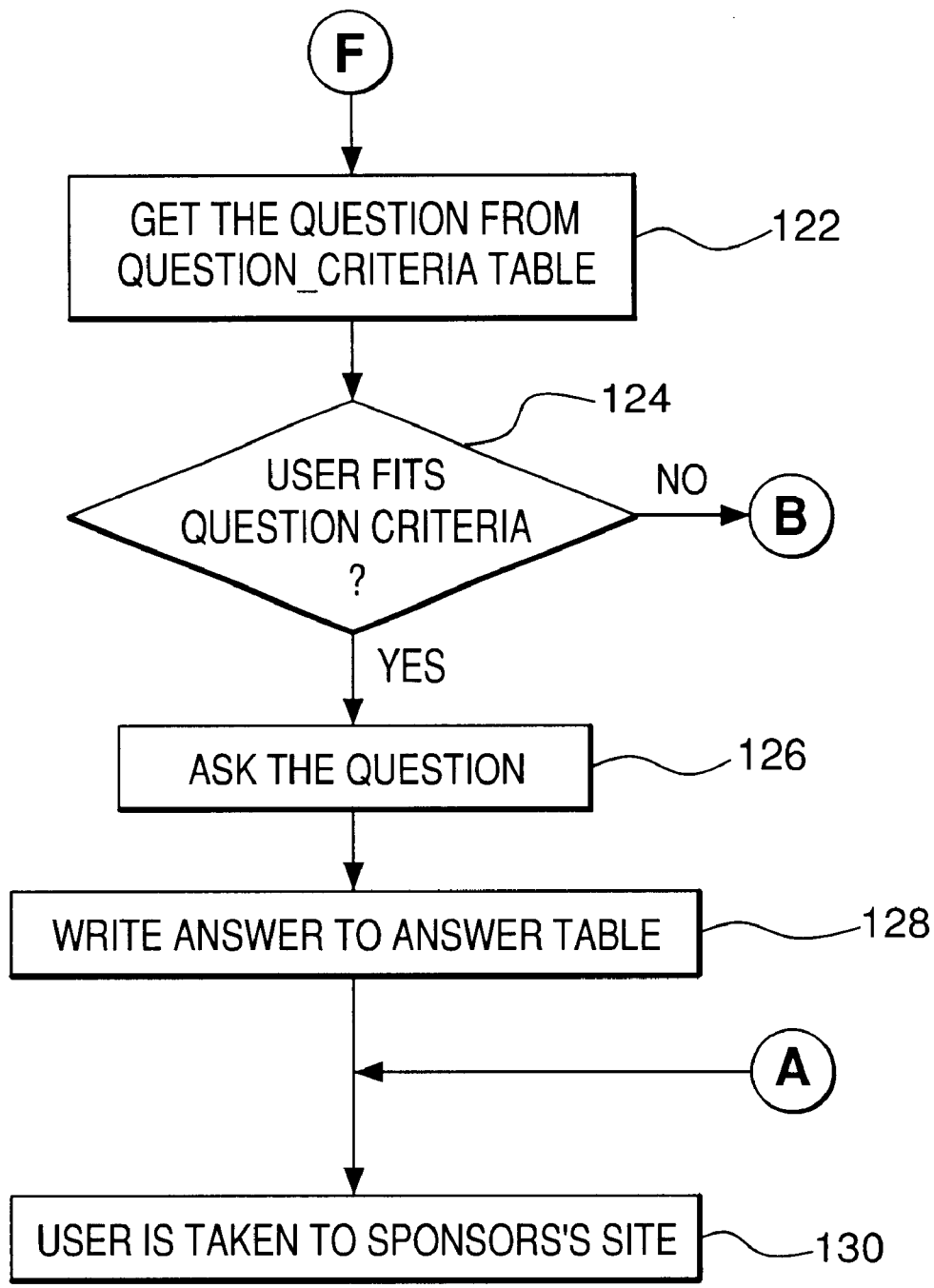
Figure 3:
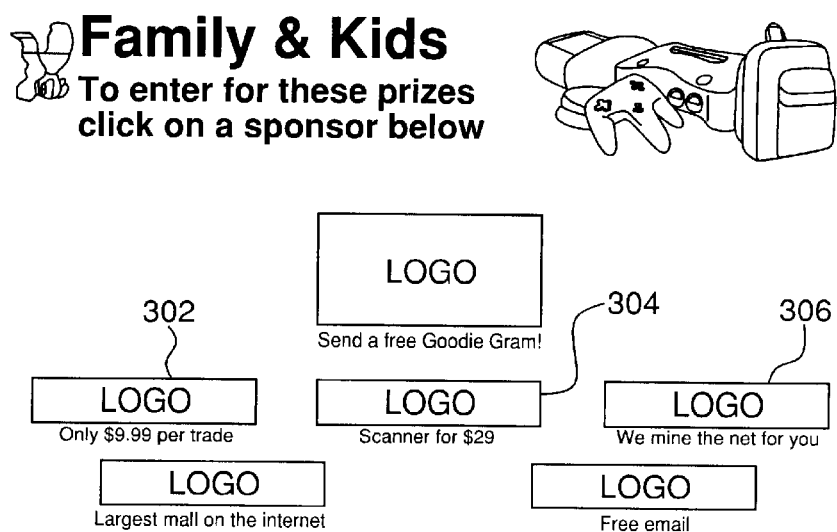
FIG. 3 is an exemplary page that displays a plurality of sponsor symbols to a user on the home WWW site, in accordance with the present invention.
Figure 4:
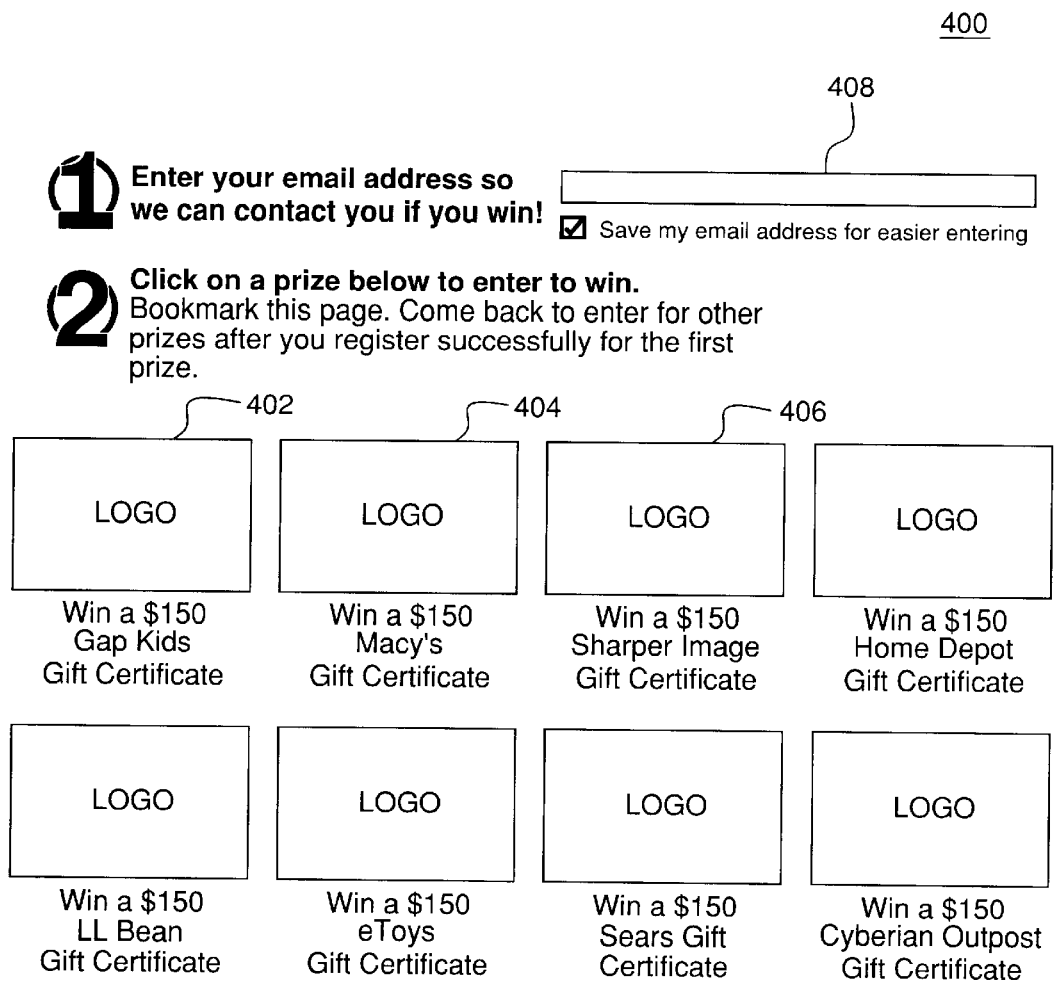
FIG. 4 is an exemplary page that displays a set of prize symbols to the user on the home WWW site, in accordance with the present invention.

Referring now to FIGS. 1A and 1B, there is shown a flow diagram illustrating the operation of an on-line system 100 for collecting demographic information from a user of a home WWW site and for dynamically selecting questions to present to the user. When the user first enters the home WWW site, the user is presented with an introductory page on the site (such as page 200 shown in FIG. 2.) On the introductory page, the user is presented with a set of prize categories such as categories 202, 204, 206. Each of the prize categories 202, 204, 206 corresponds to a set of prizes in a particular subject-matter category that the user can register to win at no cost to the user. In step 102, the user selects one of the prize categories (by clicking on the appropriate icon in introductory page 200). In response to the selection of the prize category by the user in step 102, the system displays a further page 300 on the home WWW site to the user. Page 300 includes a plurality of sponsor symbols 302, 304, 306. Each sponsor symbol 302, 304, 306 corresponds to an entity (or sponsor) that has paid the owner of the home WWW site for the right to be presented to the user on the home WWW site. In step 104, the user selects one of the sponsor symbols (by clicking on the appropriate icon in introductory page 300). In response to the selection of the sponsor symbol by the user in step 104, the system displays a further page 400 on the home WWW site to the user. Page 400 includes a set of prize symbols 402, 404, 406. Each prize symbol 402, 404, 406 corresponds to a prize: (i) that the user can register to win at no cost to the user, and (ii) that has been sponsored (or paid for) by the entity associated with the sponsor symbol selected by the user in step 104. In step 106, the user enters his/her e-mail address in block 408 and selects one of the prize symbols (by clicking on the appropriate icon in introductory page 400).

In response to the selection of the prize symbol by the user in step 106, the user determines in step 108 whether the user has previously registered with the home WWW site by comparing the e-mail address entered in box 408 with a stored list of e-mail addresses associated with registered users of the home WWW site. If the user is not a registered user, then in step 110 the user is requested to register with the home WWW site. During the registration process, the system displays a page (such as page 500 shown in FIG. 5) requesting that the user enter certain demographic information about himself such as, for example, the user's full name, address, phone number, birth date, gender marital status, occupation, income level, education level, whether the user is a home owner or a renter, if the user has children and if so how many and their ages, whether the user's spouse works and his/her occupation, and whether the user wishes to receive offers or prize information electronically from the home WWW site. For each user, this demographic information is stored in a User record at the home WWW site. In one embodiment, the User record has the data format shown in Table 1 below:

TABLE 1

USER RECORD

| Field Name | Field Type |
| --- | --- |
| USR_ID | NUMBER (12) |
| USR_EMAIL | VARCHAR (50) |
| USR_SAL | CHAR (5) |
| USR_FNAME | VARCHAR2 (50) |
| USR_MI | CHAR (1) |
| USR_LNAME | VARCHAR2 (50) |
| USR_ADRS1 | VARCHAR2 (50) |
| USR_ADRS2 | VARCHAR2 (50) |
| USR_APT | VARCHAR2 (50) |
| USR_CITY | VARCHAR2 (50) |
| USR_STATE | VARCHAR2 (10) |
| USR_ZIP | VARCHAR2 (20) |
| USR_PHONE | VARCHAR2 (30) |
| USR_BDATE | DATE |
| USR_STATUS | VARCHAR2 (10) |
| USR_WORK | VARCHAR2 (10) |
| USR_WIFEWRK | VARCHAR2 (10) |
| USR_DESC | VARCHAR2 (10) |
| USR_WIFEDESC | VARCHAR2 (10) |
| USR_INCOME | VARCHAR2 (10) |
| USR_OWN_HOME | CHAR (1) |
| USR_RENT_HOME | CHAR (1) |
| USR_MAILINGS | CHAR (1) |
| USR_UPDATE | DATE |
| USR_SEX | VARCHAR2 (10) |
| EDUCATION | NUMBER (3) |
| OTHER_PEOPLE | CHAR (1) |
| CHILD_UNDER_ONE | CHAR (1) |
| OTHER_GENDER1 | CHAR (1) |
| OTHER_AGE1 | NUMBER (3) |
| OTHER_GENDER2 | CHAR (1) |
| OTHER_AGE2 | NUMBER (3) |
| OTHER_GENDER3 | CHAR (1) |
| OTHER_AGE3 | NUMBER (3) |
| OTHER_GENDER4 | CHAR (1) |
| OTHER_AGE4 | NUMBER (3) |
| INFO_USAGE | CHAR (1) |
| RECEIVE_OFFERS | CHAR (1) |
| COUNTRY | VARCHAR2 (10) |
| RESIDENCE | VARCHAR2 (10) |
| SPONSOR_CODE | VARCHAR2 (10) |

TABLE 1-continued

USER RECORD

| Field Name | Field Type |
|---|---|
| USR_AGE | NUMBER (3) |
| JOIN_DATE | DATE |

The USR_STATUS field in the User Record stores a flag representing whether the user is currently an active or inactive user of the home WWW site; the USR_MAILINGS and INFO_USAGE fields correspond to the information requested in questions 9 and 10 of page 500 and store information representing whether the user has opted to receive offerings from the home WWW site and, if so, whether the user wishes to receive such offerings electronically by e-mail; and the SPR_ID field stores an identification number corresponding to the sponsor that the user selected in step 104 during the user's first visit to the home WWW site. The remaining fields in the User Record store information that is self-evident from the field names.

In an alternate embodiment, only a subset of the demographic information represented by the User Record shown in Table 1 is collected from the user during the registration and used later in connection with the question selection process. The subset of demographic information includes, for example, only the user's name, address, phone number, birth date, and whether the user wishes to receive offers or prize information electronically from the home WWW site (i.e., the shipping information and questions 6, 9 and 10 shown on page 500.)

As explained more fully below, the present invention stores a plurality of sponsor-specific questions for each entity (or sponsor) associated with a sponsor symbol that may be selected by a given user in step 104. During successive visits of the user to the home WWW site where the user selects the same sponsor symbol in step 104, individual questions from the plurality of sponsor-specific questions associated with the selected sponsor symbol are presented to the user. In one embodiment, during each successive visit of the user where the user selects the same sponsor symbol in step 104, the system first identifies an unanswered question from the plurality of candidate questions associated with the selected sponsor symbol. Next, the system compares demographic criteria associated with the unanswered question (stored in the logical_operator field of a Question_Criteria_Record discussed below) with the demographic information about the user stored in the User Record associated with the user. The unanswered question is then selected for subsequent presentation to the user only if the demographic criteria associated with the unanswered question matches the demographic information of the user. If the demographic criteria associated with the unanswered question does not match the demographic information of the user, a further unanswered question is identified from the plurality of candidate questions associated with the selected sponsor symbol, and the process is repeated until either (i) the demographic criteria associated with an unanswered question matches the demographic information of the user, or (ii) the system is unable to find an unanswered question that is associated with the selected sponsor symbol having demographic criteria that matches the demographic information of the user. In this embodiment, during each iteration of the question selection process described above, the unanswered questions are analyzed sequentially in the order set forth in a User_Ques Record (discussed below). For example, the first question represented in the User_Ques record is first analyzed against the user's demographics. If the user's demographics match the criteria associated with the first question, then the first question is selected for presentation to the user and, during the next visit of the user to the site where the user selects the same sponsor symbol, the second question represented in the User_Ques record is next analyzed against the user's demographics. Alternatively, if the user's demographics does not match the criteria associated with the first question, then the second question represented in the User_Ques record is analyzed against the user's demographics and the process is repeated sequentially (i.e., the third question is analyzed next, and so on) until the system finds a question with demographic criteria that match the user's demographics. During each subsequent visit of the user to site where the same sponsor symbol is selected, the system initially analyzes the question in the User_Ques record immediately following the question presented to the user during the last visit where the same sponsor symbol was selected, and the system repeats the process until a question with matching demographic criteria is found.

In a further embodiment of the present invention, the order in which the questions from the User_Ques record are analyzed against the user's demographics is based on previous answers provided by the user to earlier questions represented in the User_Ques record. For example, in this embodiment, the third question in the User_Ques record will be analyzed against the user's demographics only if the user answered "YES" to the first or second questions in the User_Ques record; otherwise the third question will be skipped and the fourth question in the User_Ques record will next be analyzed against the user's demographics. Thus, in this embodiment, the ordering and selection of the questions presented to the user during the various visits is determined using both the user's demographic information and answers given by the user to previous sponsor-specific questions associated with the selected sponsor symbol. Decision logic (stored in the DRQ_LOGIC fields of the DRQUESTNS record discussed below) specific to each individual sponsor and keyed to previous user answers isused in this embodiment to select and determine the order of questions presented to the user during the various visits to the home WWW site. The sponsor-specific decision logic uses answers given by the user to previous sponsor-specific questions associated with the sponsor to decide which sponsor-specific question to next analyze against the user's demographic information until a question with demographic criteria that matches that of the user is found.

For each sponsor (see spr_id field in Table 2 below) that may be selected by a given user in step 104, the associated plurality of sponsor-specific questions (see spdq1 to spdq30 fields below) that may be presented to any given user is preferably represented in a Sponsor_Question_Template record having the data format shown below in Table 2.

TABLE 2

SPONSOR_QUESTION_TEMPLATE

| Field Name | Field Type |
|---|---|
| SPR_ID | NUMBER (12) |
| SPDQ1 | VARCHAR2 (14) |
| SPDQ2 | VARCHAR2 (14) |
| SPDQ3 | VARCHAR2 (14) |
| SPDQ4 | VARCHAR2 (14) |

TABLE 2-continued

SPONSOR_QUESTION_TEMPLATE

| Field Name | Field Type |
| --- | --- |
| SPDQ5 | VARCHAR2 (14) |
| SPDQ6 | VARCHAR2 (14) |
| SPDQ7 | VARCHAR2 (14) |
| SPDQ8 | VARCHAR2 (14) |
| SPDQ9 | VARCHAR2 (14) |
| SPDQ10 | VARCHAR2 (14) |
| SPDQ11 | VARCHAR2 (14) |
| SPDQ12 | VARCHAR2 (14) |
| SPDQ13 | VARCHAR2 (14) |
| SPDQ14 | VARCHAR2 (14) |
| SPDQ15 | VARCHAR2 (14) |
| SPDQ16 | VARCHAR2 (14) |
| SPDQ17 | VARCHAR2 (14) |
| SPDQ18 | VARCHAR2 (14) |
| SPDQ19 | VARCHAR2 (14) |
| SPDQ20 | VARCHAR2 (14) |
| SPDQ21 | VARCHAR2 (14) |
| SPDQ22 | VARCHAR2 (14) |
| SPDQ23 | VARCHAR2 (14) |
| SPDQ24 | VARCHAR2 (14) |
| SPDQ25 | VARCHAR2 (14) |
| SPDQ26 | VARCHAR2 (14) |
| SPDQ27 | VARCHAR2 (14) |
| SPDQ28 | VARCHAR2 (14) |
| SPDQ29 | VARCHAR2 (14) |
| SPDQ30 | VARCHAR2 (14) |

Referring again to FIGS. 1A and 1B, in response to the selection of the prize symbol by the user in step 106 (if the user was already a registered user) or the completion of the user registration process in step 110, the system determines in step 112 whether the sponsor corresponding to the sponsor symbol selected by the user in step 104 has provided sponsor-specific questions to be presented to user's that select the sponsor's symbol in step 104. This step is performed by examining the existing Sponsor_Question_Template records, and determining whether a Sponsor_Question_Template record exists with a spr_id field corresponding to the sponsor symbol selected in step 104. If so, the system proceeds to step 114, where the system determines whether a User_Ques record associated with the user and the selected sponsor exists. This step is performed by examining the existing User_Ques records (stored in a User_Ques table and discussed below), and determining whether a User_Ques record exists with a user_id field corresponding to the current user and a spr_id field corresponding to the sponsor symbol selected in step 104. If such a User_Ques record does not exist, then as discussed below, in step 116 the system creates such a record from the Sponsor_Question_Template record associated with the sponsor selected in step 104.

In step 116, the system creates a User_Ques record associated with the current user and the sponsor selected in step 104 by inserting the identification number of the current user in the user_id field of a blank User_Ques record, and inserting the identification number associated with the sponsor selected in step 104 in the spr_id field of the blank User_Ques record. Each User_Ques record preferably has the data format shown below in Table 3. Thus, in addition to the user_id and spr_id fields, each User_Ques record includes a plurality of fields for storing answers (see usrqa1 to usrqa30 fields in Table 3) of the user to the sponsor-specific questions stored in the Sponsor_Question_Template associated with the sponsor selected by the user in step 104.

TABLE 3

USER_QUES RECORD

| Field Name | Field Type |
| --- | --- |
| USR_ID | NUMBER (12) |
| SPR_ID | NUMBER (12) |
| USRQA1 | CHAR (1) |
| USRQA2 | CHAR (1) |
| USRQA3 | CHAR (1) |
| USRQA4 | CHAR (1) |
| USRQA5 | CHAR (1) |
| USRQA6 | CHAR (1) |
| USRQA7 | CHAR (1) |
| USRQA8 | CHAR (1) |
| USRQA9 | CHAR (1) |
| USRQA10 | CHAR (1) |
| USRQA11 | CHAR (1) |
| USRQA12 | CHAR (1) |
| USRQA13 | CHAR (1) |
| USRQA14 | CHAR (1) |
| USRQA15 | CHAR (1) |
| USRQA16 | CHAR (1) |
| USRQA17 | CHAR (1) |
| USRQA18 | CHAR (1) |
| USRQA19 | CHAR (1) |
| USRQA20 | CHAR (1) |
| USRQA21 | CHAR (1) |
| USRQA22 | CHAR (1) |
| USRQA23 | CHAR (1) |
| USRQA24 | CHAR (1) |
| USRQA25 | CHAR (1) |
| USRQA26 | CHAR (1) |
| USRQA27 | CHAR (1) |
| USRQA28 | CHAR (1) |
| USRQA29 | CHAR (1) |
| USRQA30 | CHAR (1) |
| USR_EMAIL | VARCHAR2 (50) |

Referring again to FIGS. 1A and 1B, in step 118 the system determines whether there are any applicable sponsor-specific questions associated with the selected sponsor that have not yet been analyzed against the user's demographic information. This step is performed by examining the answer fields of the User_Ques record associated with the current user and the selected sponsor, and examining the Sponsor_Question_Template associated with the selected sponsor, and determining whether any of the applicable questions set forth in the Sponsor_Question_Template have yet to have been analyzed against the user's demographic information. If one or more of such questions have yet to have been analyzed against the user's demographic information, then in step 120, the system selects an unanswered question from the User_Ques record associated with the current user and the selected sponsor for analysis. As mentioned above, the order in which questions are selected for analysis against the user's demographics in step 120 can either be based simply on the ordering of the questions within the User_Ques record, or alternatively, on decision logic which uses previous answers to determine the order in which questions are selected for analysis against the user's demographic information.

For each question that may be selected by the system in step 120, the system stores a DRQUESTNS record that includes, among other things, an identification number associated with the question (see drq_id field below), the sponsor associated with the question (see spr_id field below), the text of the question and the possible answers to the question (see drq_question title and drq_no_of_choices fields, respectively) and the decision logic described above (or objective rules) that specifies whether, based on previous answers of the user, the question should be presented to the user (see drq_logic field below.) In the embodiment described above where questions are selected for analysis against the user's demographics in step 120 can based simply on the ordering of the questions within the User_Ques record, the drq_logic field is not used. Each DRQUESTNS record preferably has the data format shown below in Table 4.

TABLE 4

DRQUESTNS RECORD

| Field Name | Field Type |
|---|---|
| DRQ_ID | NUMBER (12) |
| SPR_ID | NUMBER (12) |
| DRQ_HTML | LONG |
| DRQ_LOGIC | VARCHAR2 (50) |
| DRQ_QUESTION_TITLE | VARCHAR2 (500) |
| DRQ_NO_OF_CHOICES | NUMBER (5) |

Referring again to FIGS. 1A and 1B, in step 120 the system retrieves the DRQUESTNS record associated with the next unanswered question to be applied against the user's demographic information. Next, in step 122, the system retrieves question criteria information associated with the selected unanswered question. For each question that may be selected by the system in step 120, the system stores a QUESTION_CRITERIA record that includes, among other things, an identification number associated with the question (see dr_question_id field in Table 5), the sponsor associated with the question (see spr_id field in Table 5) and objective criteria (see criteria_text and logical_operator fields in Table 5) for determining whether demographic criteria associated with question match the demographic information of the user. The information stored in the criteria_text and logical_operator fields contains, for example, demographic parameters that must be met in order for the question to be presented to the user, e.g., the user must be male and have no children in order for this question to be presented to the user, or the user must live in a certain geographic area and/or be in a certain age bracket in order for this question to be presented to the user. Each QUESTION_CRITERIA record preferably has the data format shown below in Table 5.

TABLE 5

QUESTION_CRITERIA RECORD

| Field Name | Field Type |
|---|---|
| CRITERIA_ID | NUMBER (12) |
| SPONSOR_ID | NUMBER (12) |
| DR_QUESTION_ID | NUMBER (12) |
| CRITERIA_TEXT | VARCHAR2 (2000) |
| LOGICAL_OPERATOR | VARCHAR2 (5) |

In step 124, the system determines whether to present the selected question to the user by applying the objective criteria in the QUESTION_CRITERIA record to the user's demographic information. If, based on the user's demographic information, the objective criteria (stored in the criteria_text and logical_operator fields in Table 5) indicates that the question should be presented to the user then, in step 126, the selected question is presented to the user; otherwise, the system proceeds back to step 118 where the process is repeated. FIG. 6 shows an exemplary page 600 that may be used to display a sponsor-specific question 610 to the user on the home WWW site.

After the sponsor-specific question is presented to the user, the system waits for the user to answer the question and, in step 128, the system writes the user's answer to an answer table. Following the recording of the user's answer, the user is given an opportunity to register to win the prize selected in step 106 (by clicking on text 620) after which, the system redirects the user from the home WWW site to a further WWW site associated with the sponsor selected in step 104.

In one embodiment of the present invention, the steps described above (i.e., steps 102–130) are performed during an initial visit of the user to the home WWW site. Thereafter, during a second (and subsequent) visit(s) of the user to the WWW site where the same sponsor symbol is selected in step 104, the answer(s) given by the user to the previously selected sponsor-specific question(s) are optionally used, in conjunction with the user's demographic information, to select a further sponsor-specific question to present to the user in steps 120–124. This process is repeated during subsequent visits of the user to the home WWW site in which the user selects the same sponsor symbol in step 104, until the User_Ques record associated with the user and the selected sponsor indicates that all the sponsor-specific questions associated with the selected sponsor and applicable to the user have been presented to the user. If the user visits the home WWW site and selects the same sponsor symbol enough times such that all of sponsor-specific questions applicable to the user have been presented to the user, then, in a preferred embodiment, in response to further visits where the user selects the same sponsor symbol, the system begins selecting and presenting site-specific questions (described below) to the user.

Referring again to FIGS. 1A and 1B, if, in step 112, the system determined that the sponsor corresponding to the sponsor symbol selected by the user in step 104 did not provide sponsor-specific questions to be presented to user's that select the sponsor's symbol in step 104, then the system proceeds to step 132 where a site question is selected for analysis against the user's demographic information. In contrast to the sponsor-specific questions discussed above which are designed to solicit information that is tailored for a particular sponsor, each site question is designed to solicit more general marketing information from a user.

For each site question that may be selected by the system in step 132, the system stores a SITE_QUESTION record that includes, among other things, an identification number associated with the question (see site_id field in Table 6), the text of the question and the possible answers to the question (see title and no_of_choices fields) and decision logic (or objective rules) that specifies whether, based on previous answers of the user, the question should be presented to the user (see logic field below.) In one embodiment, where unanswered site-specific questions are selected randomly in step 132 for analysis against the user's demographic information, the logic field is not used. Each SITE_QUESTION record preferably has the data format shown below in Table 6.

TABLE 6

SITE_QUESTION RECORD

| Field Name | Field Type |
|---|---|
| SITE_ID | NUMBER (12) |
| HTML | LONG |
| LOGIC | VARCHAR2 (50) |
| TITLE | VARCHAR2 (500) |
| TYPE | VARCHAR2 (50) |
| NO_OF_CHOICES | NUMBER (5) |

Referring again to FIGS. 1A and 1B, in step 132 the system retrieves the SITE_QUESTION record associated with the next unanswered site question to be applied against the user's demographic information. Next, in step 134, the system retrieves question criteria information associated with the selected unanswered site question. For each site question that may be selected by the system in step 132, the system stores a SQ_CRITERIA record that includes, among other things, an identification number associated with the question (see site_ques_id field in Table 7), and objective criteria (see text and logical_operator fields in Table 7) for determining whether demographic criteria associated with the question match the demographic information of the user. The information stored in the text and logical_operator fields contains, for example, demographic parameters that must be met in order for the question to be presented to the user, e.g., the user must be male and have no children in order for this question to be presented to the user, or the user must live in a certain geographic area and/or be in a certain age bracket in order for this question to be presented to the user. Each SQ_CRITERIA record preferably has the data format shown below in Table 7.

TABLE 7

SQ_CRITERIA RECORD

| Field Name | Field Type |
|---|---|
| SITE_ID | NUMBER (12) |
| SITE_QUES_ID | NUMBER (12) |
| TEXT | VARCHAR2 (2000) |
| LOGICAL_OPERATOR | VARCHAR2 (5) |

In step 134, the system determines whether to present the selected site question to the user by applying the objective criteria in the SQ_CRITERIA record to the user's demographic information. If, based on the user's demographic information, the objective criteria (stored in the text and logical_operator fields in Table 7) indicate that the selected site question should be presented to the user then, in step 136, the selected question is presented to the user; otherwise, the system proceeds back to step 132 where the process is repeated.

After the site question is presented to the user, the system waits for the user to answer the question and, in step 138, the system writes the user's answer to an answer table. Following the recording of the user's answer, the user is given an opportunity to register to win the prize selected in step 106 (by clicking on text 520) after which, the system redirects the user from the home WWW site to a further WWW site associated with the sponsor selected in step 104.

Although, in the description set forth above, the present invention was described in conjunction with the selection of a single sponsor symbol in step 104, it will be understood that during subsequent visits of the user to the home WWW site the user may select a different sponsor symbol during each iteration of step 104. In such an instance, the process of the present invention will be implemented the same as described above, except the sponsor-specific questions selected for presentation to the user will be different (i.e., the sponsor-specific questions will be tailored to the different sponsor) and the logic and criteria used for determining which of these sponsor-specific questions to present to the user and in what order will similarly be different (i.e., again, this logic and criteria will be tailored to the different sponsor.) Thus, multiple sponsors can collect demographic and marketing information (e.g., the answers to the sponsor-specific question) tailored for each sponsor from users that visit the home WWW site.

Figure 7:
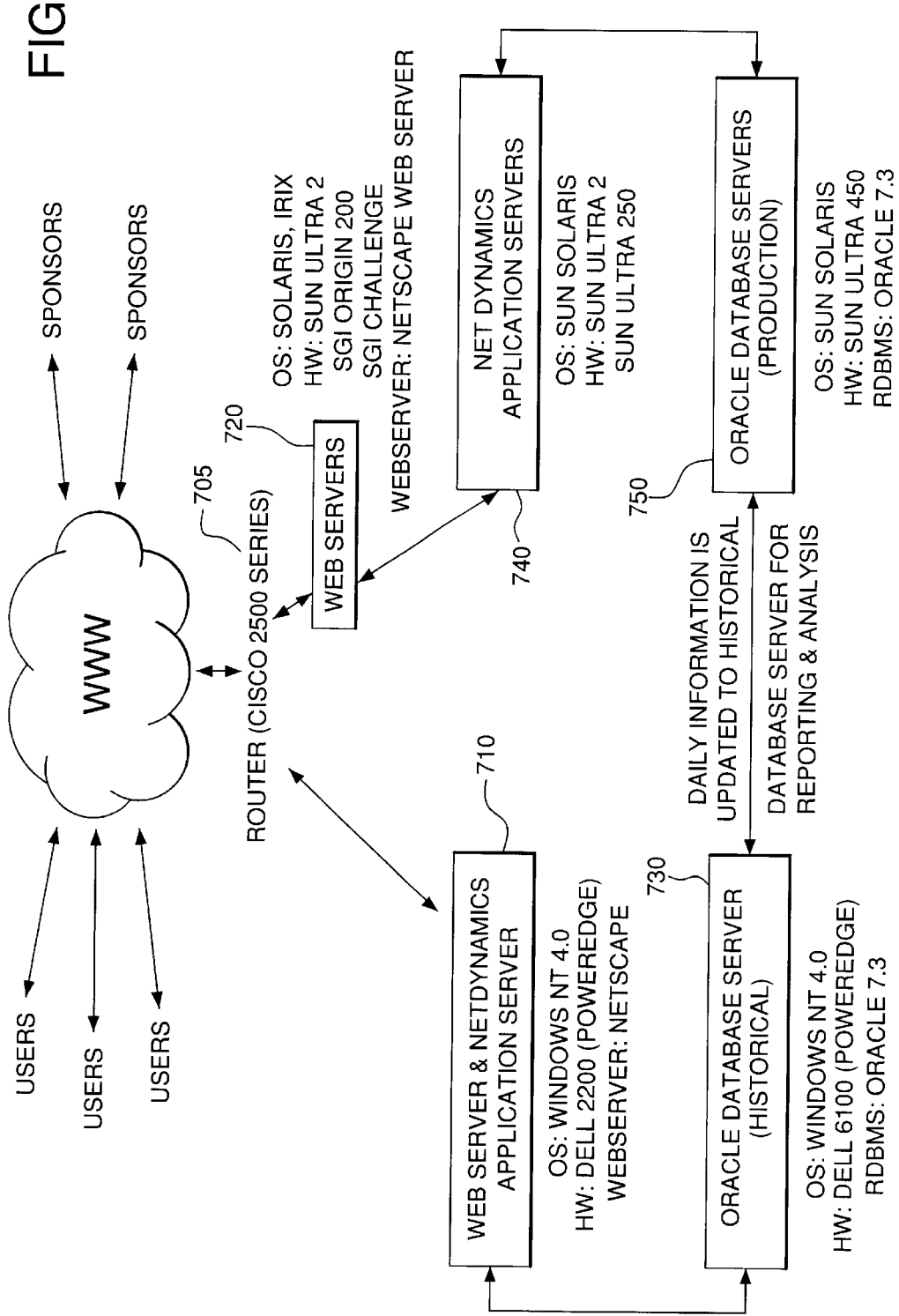
FIG. 7 is a block diagram showing the hardware components of on-line system for collecting demographic information from a user of a home WWW site and for dynamically selecting questions to present to the user, in accordance with the present invention.

Referring now to FIG. 7, there is shown a block diagram of the hardware components of an on-line system 700 for collecting demographic information from a user of a home WWW site and for dynamically selecting questions to present to the user, in accordance with the present invention. System 700 includes a router 705 coupled to web servers 710 and 720. The router is coupled through the WWW to users that send and receive signals from web servers 710 and 720. Each user preferably communicates with the home WWW site through a user personal computer (not shown) that displays the page information provided by the home WWW site described above, and sends signals back to the home WWW site indicating the user's selections in steps 102, 104, 106, 128 and the other information input by the user, including, for example, the user's e-mail information and demographic information discussed above. Web server 720 is in turn coupled to application server 740. The system described above in connection with FIGS. 1A and 1B is preferably implemented in software on web servers 710, 720 and application server 730. The various record tables described above are stored in databases 730 and 750.

In accordance with a further alternative embodiment, parameters in addition to a user's demographic information and previous answers are used to select the next sponsor-specific/site question to present to the user in steps 120–124 and 132–134. The additional parameters used for question selection include prizes for which a user registers, prizes a user wins, the prize categories that the user has selected during past visits to the home WWW site, and/or how long the user has stayed on various pages of the home WWW site during the current and earlier visits to the home WWW site.

In accordance with a still further aspect of the invention (not shown in FIGS. 1A and 1B,) if a user attempts to leave the home WWW site prior to step 130 by, for example, manually changing the URL on the user's web browser, the present invention selects and displays a site question (i.e., steps 134–138) to the user prior to allowing the user to move to the next web site.

The previous description of the preferred embodiments is provided to enable any person skilled in the art to make or use the present invention. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. An on-line method for collecting demographic information from a user of a home world-wide-web (WWW) site and for dynamically selecting questions to present to the user, comprising the steps of:

(A) displaying a plurality of sponsor symbols for the user on the home WWW site, wherein each of the sponsor symbols corresponds to an entity that has paid an owner of the home WWW site for the right to present information to the user on the site;

(B) receiving, at the home WWW site, a signal from the user indicating a selection of one of the sponsor symbols by the user;

(C) displaying a first set of one or more prize symbols for the user on the home WWW site in response to the selected sponsor symbol, wherein each prize symbol corresponds to a prize that the user can register to win at no cost to the user;

(D) receiving, at the home WWW site, a signal from the user indicating a selection of one prize symbol from the first set of prize symbols by the user;

(E) determining whether the user is a registered user of the home WWW site and, if the user is not a registered user of the home WWW site, collecting demographic information about the user during registration of the user on the home WWW site;

(F) selecting, in response to the demographic information, a question from a first plurality of candidate questions, wherein each of the first plurality of candidate questions is associated with the entity corresponding to the selected sponsor symbol;

(G) displaying the selected question to the user on the home WWW site;

(H) receiving a signal from the user indicating an answer of the user to the selected question, and storing the answer in a database;

(I) after step (H), redirecting the user from the home WWW site to a further WWW site associated with the sponsor symbol selected in step (B).

2. The method of claim 1, wherein steps (A)–(I) are performed during a first visit of the user to the home WWW site.

3. The method of claim 2, wherein the following steps are performed during a second visit of the user to the home WWW site, the second visit being subsequent to the first visit of the user to the home WWW site:

(J) redisplaying the plurality of sponsor symbols for the user on the home WWW site;

(K) receiving, at the home WWW site, a signal from the user indicating a selection of one of the redisplayed sponsor symbols by the user, wherein the redisplayed sponsor symbol selected in step (K) corresponds to the same sponsor symbol previously selected in step (B);

(L) redisplaying the first set of one or more prize symbols for the user on the home WWW site in response to the redisplayed sponsor symbol selected in step (K);

(M) receiving, at the home WWW site, a signal from the user indicating a selection of one prize symbol from the redisplayed first set of prize symbols by the user;

(N) selecting, in response to the demographic information, a question from the first plurality of candidate questions, wherein the question selected in step (N) is different from the question previously selected in step (F);

(O) displaying the question selected in step (N) to the user on the home WWW site;

(P) receiving a signal from the user indicating an answer of the user to the question displayed in step (P), and storing the answer in the database;

(Q) after step (P), redirecting the user from the home WWW site to the further WWW site.

4. The method of claim 3, further comprising repeating steps (J) through (Q) during subsequent visits of the user to the home WWW site, the subsequent visits being after the first and second visits of the user to the home WWW site.

5. The method of claim 4, wherein step (N) comprises:

(N) selecting, in response to the demographic information and one or more previous answers provided by the user to one or more questions from the first plurality of candidate questions, a question from the first plurality of candidate questions, wherein the question selected in step (N) is different from the question previously selected in step (F).

6. The method of claim 4, wherein step (N) comprises:

(i) identifying a next unanswered question from a first plurality of candidate questions, wherein each of the first plurality of candidate questions is associated with the entity corresponding to the selected sponsor symbol;

(ii) comparing demographic criteria associated with the next unanswered question with the demographic information about the user;

(iii) selecting the next unanswered question for presentation to the user in step (G) if the demographic criteria associated with the next unanswered question matches the demographic information about the user;

(iv) repeating steps (i)–(iii) using a further unanswered question from the first plurality of candidate questions if the demographic criteria associated with the next unanswered question does not match the demographic information about the user.

7. The method of claim 6, wherein the next unanswered question is identified during each iteration of step (N)(i) by sequentially selecting unanswered questions from a record associated with the user and the entity corresponding to the selected sponsor symbol.

8. The method of claim 6, wherein the next unanswered question is identified during each iteration of step (N)(i) by selecting, in response to one or more previous answers provided by the user, an unanswered question from a record associated with the user and the entity corresponding to the selected sponsor symbol.

9. The method of claim 3, wherein the following steps are performed during a third visit of the user to the home WWW site, the third visit being subsequent to the first and second visits of the user to the home WWW site:

(R) redisplaying the plurality of sponsor symbols for the user on the home WWW site;

(S) receiving, at the home WWW site, a signal from the user indicating a selection of one of the redisplayed sponsor symbols by the user, wherein the redisplayed sponsor symbol selected in step (S) corresponds to the same sponsor symbol previously selected in step (B);

(T) redisplaying the first set of one or more prize symbols for the user on the home WWW site in response to the redisplayed sponsor symbol selected in step (S);

(U) receiving, at the home WWW site, a signal from the user indicating a selection of one prize symbol from the redisplayed first set of prize symbols by the user;

(V) determining whether at least one question from the first plurality of candidate questions remains unanswered by the user:

(W) if at least one question from the first plurality of candidate questions remains unanswered by the user, then
 (i) selecting, in response to the demographic information, an unanswered question from the first plurality of candidate questions;
 (ii) displaying the question selected in step (W)(ii) to the user on the home WWW site;

(iii) receiving a signal from the user indicating an answer of the user to the question displayed in step (W)(ii), and storing the answer in the database;

(iv) after step (W)(iii), redirecting the user from the home WWW site to the further WWW site; and (X) if no question from the first plurality of candidate questions remains unanswered by the user, then (i) selecting, in response to the demographic information, a question from a second plurality of candidate questions, wherein each of the second plurality of candidate questions is associated only with the home WWW site, and the second plurality of candidate questions is different from the first plurality of candidate questions;

(ii) displaying the question selected in step (X)(ii) to the user on the home WWW site;

(iii) receiving a signal from the user indicating an answer of the user to the question displayed in step (X)(ii), and storing the answer in the database;

(iv) after step (X)(iii), redirecting the user from the home WWW site to the further WWW site.

10. The method of claim 9, further comprising repeating steps (R) through (X) during subsequent visits of the user to the home WWW site, the subsequent visits being after the first, second and third visits of the user to the home WWW site.

11. The method of claim 10, wherein step (W)(i) comprises:

(i) selecting, in response to the demographic information and one or more previous answers provided by the user, an unanswered question from the first plurality of candidate questions.

12. The method of claim 3, wherein the following steps are performed during a third visit of the user to the home WWW site, the third visit being subsequent to the first and second visits of the user to the home WWW site:

(R) redisplaying the plurality of sponsor symbols for the user on the home WWW site;

(S) receiving, at the home WWW site, a signal from the user indicating a selection of one of the redisplayed sponsor symbols by the user, wherein the redisplayed sponsor symbol selected in step (S) corresponds to a sponsor symbol that is different from the sponsor symbol previously selected in step (B);

(T) displaying a second set of one or more prize symbols for the user on the home WWW site in response to the sponsor symbol selected in step (S), the second set of prize symbols being different than the first set of one or more prize symbols;

(U) receiving, at the home WWW site, a signal from the user indicating a selection of one prize symbol from the second set of prize symbols by the user;

(V) selecting, in response to the demographic information, a question from a second plurality of candidate questions, wherein each of the second plurality of candidate questions is associated with the entity corresponding to the sponsor symbol selected in step (S), and the second plurality of candidate questions is different from the first plurality of candidate questions;

(W) displaying the question selected in step (V) to the user on the home WWW site;

(X) receiving a signal from the user indicating an answer of the user to the question displayed in step (W), and storing the answer in the database;

(Y) after step (X), redirecting the user from the home WWW site to a different WWW site associated with the sponsor symbol selected in step (S).

13. The method of claim 12, wherein the following steps are performed during a fourth visit of the user to the home WWW site, the fourth visit being subsequent to the first, second and third visits of the user to the home WWW site:

(Z) redisplaying the plurality of sponsor symbols for the user on the home WWW site;

(AA) receiving, at the home WWW site, a signal from the user indicating a selection of one of the redisplayed sponsor symbols by the user, wherein the redisplayed sponsor symbol selected in step (AA) corresponds to the same sponsor symbol previously selected in step (S);

(BB) redisplaying the second set of one or more prize symbols for the user on the home WWW site in response to the redisplayed sponsor symbol selected in step (AA);

(CC) receiving, at the home WWW site, a signal from the user indicating a selection of one prize symbol from the redisplayed second set of prize symbols by the user;

(DD) selecting, in response to the demographic information, a question from the second plurality of candidate questions, wherein the question selected in step (DD) is different from the question previously selected in step (V);

(EE) displaying the question selected in step (DD) to the user on the home WWW site;

(FF) receiving a signal from the user indicating an answer of the user to the question displayed in step (EE), and storing the answer in the database;

(GG) after step (FF), redirecting the user from the home WWW site to the different WWW site associated with the sponsor symbol selected in step (S).

14. The method of claim 13, wherein the following steps are performed during a fifth visit of the user to the home WWW site, the fifth visit being subsequent to the first, second, third and fourth visits of the user to the home WWW site:

(HH) redisplaying the plurality of sponsor symbols for the user on the home WWW site;

(II) receiving, at the home WWW site, a signal from the user indicating a selection of one of the redisplayed sponsor symbols by the user, wherein the redisplayed sponsor symbol selected in step (II) corresponds to the same sponsor symbol previously selected in step (S);

(JJ) redisplaying the second set of one or more prize symbols for the user on the home WWW site in response to the redisplayed sponsor symbol selected in step (II);

(KK) receiving, at the home WWW site, a signal from the user indicating a selection of one prize symbol from the redisplayed second set of prize symbols by the user;

(LL) determining whether at least one question from the second plurality of candidate questions remains unanswered by the user:

(MM) if at least one question from the second plurality of candidate questions remains unanswered by the user, then (i) selecting, in response to the demographic information, an unanswered question from the second plurality of candidate questions;

(ii) displaying the question selected in step (MM)(ii) to the user on the home WWW site;

(iii) receiving a signal from the user indicating an answer of the user to the question displayed in step (MM)(ii), and storing the answer in the database;

(iv) after step (MM)(iii), redirecting the user from the home WWW site to the different WWW site associated with the sponsor symbol selected in step (S); and (NN) if no question from the second plurality of candidate questions remains unanswered by the user, then
(i) selecting, in response to the demographic information, a question from a third plurality of candidate questions, wherein each of the third plurality of candidate questions is associated only with the home WWW site, and the third plurality of candidate questions is different from the first and second pluralities of candidate questions;
(ii) displaying the question selected in step (NN)(ii) to the user on the home WWW site;
(iii) receiving a signal from the user indicating an answer of the user to the question displayed in step (NN)(ii), and storing the answer in the database;
(iv) after step (NN)(iii), redirecting the user from the home WWW site to the different WWW site associated with the sponsor symbol selected in step (S).

15. The method of claim 14 wherein step (DD) comprises:
(DD) selecting, in response to the demographic information and one or more previous answers to one or more questions from the second plurality of candidate questions provided by the user, a question from the second plurality of candidate questions, wherein the question selected in step (DD) is different from the question previously selected in step (V);
and step (MM)(i) comprises:
(i) selecting, in response to the demographic information and one or more previous answers provided by the user to one or more questions from the second plurality of candidate questions, an unanswered question from the second plurality of candidate questions.

16. The method of claim 1, wherein the demographic information collected in step (E) includes the marital status of the user.

17. The method of claim 16, wherein the demographic information collected in step (E) further includes the geographic address of the user.

18. The method of claim 17, wherein the demographic information collected in step (E) further includes a number of persons in a household occupied by the user.

19. The method of claim 18, wherein the demographic information collected in step (E) further includes an annual income of the user.

20. An on-line apparatus for collecting demographic information from a user of a home world-wide-web (WWW) site and for dynamically selecting questions to present to the user, comprising:
(A) means for displaying, responsively to selection by the user of a category at an introductory page on the home site, a plurality of sponsor symbols for the user on the home WWW site, wherein each of the sponsor symbol corresponds to an entity that has paid an owner of the home WWW site for the right to present information to the user on the site;
(B) means for receiving, at the home WWW site, a signal from the user indicating a selection of one of the sponsor symbols by the user;
(C) means for displaying a first set of one or more prize symbols for the user on the home WWW site in response to the selected sponsor symbol, wherein each prize symbol corresponds to a prize that the user can register to win at no cost to the user;
(D) means for receiving, at the home WWW site, a signal from the user indicating a selection of one prize symbol from the first set of prize symbols by the user;
(E) means for determining whether the user is a registered user of the home WWW site and, if the user is not a registered user of the home WWW site, collecting demographic information about the user during registration of the user on the home WWW site;
(F) means for selecting, in response to the demographic information, a question from a first plurality of candidate questions, wherein each of the first plurality of candidate questions is associated with the entity corresponding to the selected sponsor symbol;
(G) means for displaying the selected question to the user on the home WWW site;
(H) means for receiving a signal from the user indicating an answer of the user to the selected question, and storing the answer in a database;
(I) means for redirecting the user from the home WWW site to a further WWW site associated with the selected sponsor symbol.

21. An on-line apparatus for collecting demographic information from a user of a home world-wide-web (WWW) site and for dynamically selecting questions to present to the user, comprising:
(A) a web server that services the home WWW site, wherein the web server displays, responsively to selection by the user of a category at an introductory page on the home site, a plurality of sponsor symbols for the user on the home WWW site, wherein each of the sponsor symbol corresponds to an entity that has paid an owner of the home WWW site for the right to present information to the user on the site;
(B) wherein the web server receives a signal from the user indicating a selection of one of the sponsor symbols by the user and displays a first set of one or more prize symbols for the user on the home WWW site in response to the selected sponsor symbol, wherein each prize symbol corresponds to a prize that the user can register to win at no cost to the user;
(C) wherein the web server further receives a signal from the user indicating a selection of one prize symbol from the first set of prize symbols by the user, the web server determines whether the user is a registered user of the home WWW site and, if the user is not a registered user of the home WWW site, the web server collects demographic information about the user during registration of the user on the home WWW site;
(D) wherein the web server selects, in response to the demographic information, a question from a first plurality of candidate questions, wherein each of the first plurality of candidate questions is associated with the entity corresponding to the selected sponsor symbol, and the web server displays the selected question to the user on the home WWW site;
(E) wherein the web server further receives a signal from the user indicating an answer of the user to the selected question, stores the answer in a database, and redirects the user from the home WWW site to a further WWW site associated with the selected sponsor symbol.

* * * * *